Dec. 15, 1931.   E. C. LEFRANÇOIS   1,836,761
ELECTROMAGNETIC TIME DELAY DEVICE
Filed May 1, 1928

Inventor:
Edmond Charles Lefrançois,
by Charles E. Tullar
His Attorney.

Patented Dec. 15, 1931

1,836,761

UNITED STATES PATENT OFFICE

EDMOND CHARLES LEFRANÇOIS, OF CLAMART, FRANCE, ASSIGNOR TO GENERAL ELECTRIC COMPANY, A CORPORATION OF NEW YORK

ELECTROMAGNETIC TIME DELAY DEVICE

Application filed May 1, 1928, Serial No. 274,296, and in France May 24, 1927.

The present invention relates to electromagnetic time delay devices and has for its object an improved form of electromagnetic time delay switch suitable for use in control system for electric motors and other service.

In certain motor control systems such as shown in the patent to Starie No. 1,720,613, July 9, 1929, the various contactors effecting the progressive starting of the electric motor are controlled in turn by relays which are successively operated to control the contactors after a certain time interval determined by the self induction of the relay coils.

In accordance with the present invention, I assure the starting of the motor by the relays themselves, which are modified with a view to having a greater retardation and of effecting a stronger pressure on their contacts. The relays thus modified, the use of which greatly simplifies the system by permitting the elimination of the contactors, can be used for the direct control of motors especially for motors of small and medium capacity.

Figure 1:
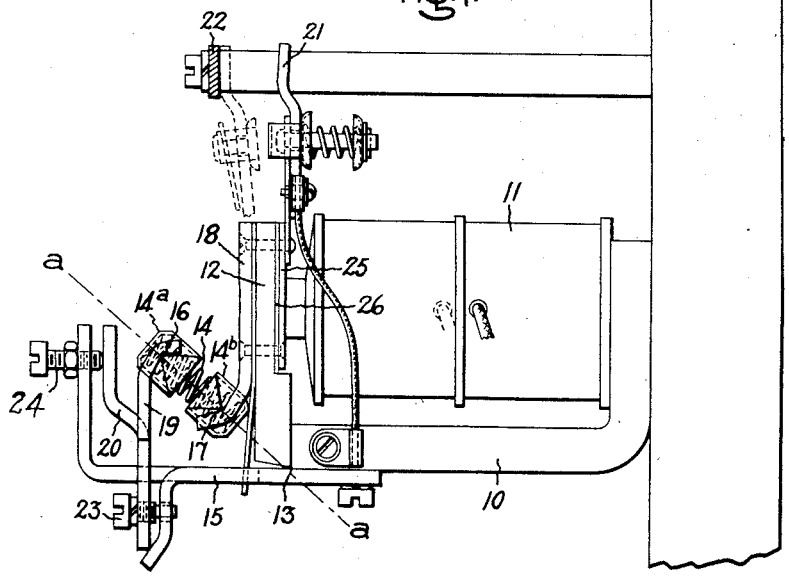
Figure 2:
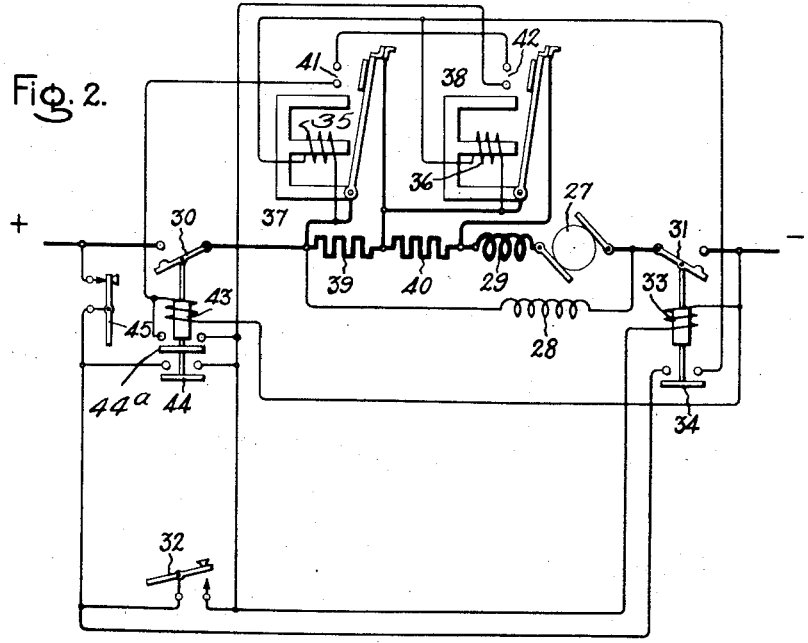

The drawings herewith show as a matter of example and in a non-limitative manner one embodiment of the invention, Fig. 1 being a view in elevation of the improved relay, while Fig. 2 shows in diagrammatic form a system of motor control embodying the relay and operated by push buttons.

Referring to Fig. 1 of the drawings, the magnetic circuit structure 10, excited by the coil 11, attracts the armature 12 which is pivoted at a point 13. This bearing point 13 of the armature 12 is constituted by a sharp edge which is pressed by a spring 14 against a bearing formed by the angle between the end of part 10 and a member 15 secured thereto. The spring 14 is provided with two knife-edge bearings 16 and 17 which engage, respectively, the lower hook-shaped end of a member 18 secured to the armature 12 and a portion 19 on the upper end of an adjustable member 20. For example, the ends of the spring 14 may rest in socket members 14$^a$ and 14$^b$ each of which is provided with a pair of oppositely disposed knife-edge bearings, and the ends of the members 18 and 20 forming bearings for the knife-edges may be forked to embrace the socket members. In this manner the spring 14 is compressed and exerts a force the direction of which is indicated by the line $a$—$a$. It will be observed that this line passes very close to the bearing point 13 of the armature but outside of it whereby a detaching force is exerted on the armature by the spring, this force, however, being of small magnitude.

If the attraction force of the coil 11 becomes very small, i. e., smaller than the detaching force applied by the spring 14, the armature will move to the left about its pivot 13. As the armature moves however, it will be observed that the line $a$—$a$ passes an increasing distance from the bearing point 13 whereby the detaching force applied by the spring increases. In other words the knife-edge pivotal bearings 16 and 17 of the compression spring 14 as well as the axis of the spring itself are moved a greater degree out of alinement with the knife-edge pivotal bearing 13 of the switch member as the switch member moves from the open position in which it is shown to the closed position as indicated by the dotted lines in the drawings. In this way without material variation in the compression of spring 14, the biasing force exerted upon the switch arm is increased materially as the switch moves from the open position to the closed position. As a result, the contact finger 21 engages the fixed contact 22 with a force of relatively great magnitude as compared with the force applied to the armature when the armature is in the attracted position.

As shown, the member 20 is supported by a screw 23 which is secured to a downwardly extending portion of the member 15. By adjusting this screw and also by adjusting another screw 24 cooperating with the upper end of the member 20, the detaching force applied by the spring 14 can be regulated as desired by varying the distance between the line $a$—$a$ and the pivot point 13, whereby the time interval of the relay is regulated.

In the operation of the relay, at the beginning of the starting operation, the coil 11 is energized by current which is sufficient to attract the armature to the position shown in Fig. 1. The coil is then short circuited and its excitation current decreases progressively, its excitation being maintained for an appreciable interval by reason of its self-inductance, the energy of the magnetic field being converted into heat by the current which circulates in the short-circuited coil. The detaching force exerted by the spring 14 being very small, on account of the short distance between the line a—a and the pivot point 13, the armature begins to move to the left only when the current in the short-circuited coil becomes very weak. As the armature moves, the force of the spring increases since the line a—a moves away from the point 13 and increases the lever arm. The closing of the contacts 21 and 22 is thus effected with a strong pressure.

It has been found that the time interval of the relay can also be regulated by arranging the armature with a plate 25 of magnetic material on its pole face, which plate is separated from the armature by a thin sheet 26 of non-magnetic material, such as brass.

A starting equipment embodying the relay previously described is shown diagrammatically in Fig. 2 in connection with the starting of a motor 27. The motor 27 with its excitation field windings 28 and 29 is connected in series with two line contactors 30 and 31. By pressing the starting button 32 the operating coil 33 of the contactor 31 is energized and this contactor is closed. Its auxiliary contact 34 at the same time closes an energizing circuit for the coils 35 and 36 of the two relays 37 and 38 which are thereby opened. It will be understood that these relays 37 and 38 are constructed as previously described in connection with Fig. 1 and are connected to short-circuit the starting resistances 39 and 40, respectively, when their armatures are released. These two relays upon being moved to their open position by the energization of coils 35 and 36 close auxiliary contacts 41 and 42 which complete an energizing circuit for the operating coil 43 of the contactor 30. This contactor thereupon closes and starts the motor, the auxiliary contact 44 of the contactor closing a holding circuit for the coils 33 and 43 so that the button 32 can be released, and the contact 44ᵃ closing a holding circuit for coil 43 in parallel with contacts 41 and 42. The closing of the contactor 30 at the same time short-circuits the coil 35 of the relay 37 which is thus deenergized and at the end of a predetermined time interval for which the relay is adjusted its armature detaches and closes a short-circuit around the resistance 39, while at the same time short-circuiting the coil 36 of the second relay 38. The latter at the end of its time interval closes a short-circuit around the resistance 40 which terminates the starting by a total short-circuiting of the resistance. By pressing a button 45 the holding circuit for the contactors 30 and 31 may be broken and the motor thereby stopped.

What I claim as new and desire to secure by Letters Patent of the United States is:

1. An electromagnetic time delay device comprising a movable switch member, resilient means for exerting a force upon said switch member to bias the member to one position, an electromagnet for actuating said switch member to and holding the same in another position, means for controlling the energization of said electromagnet to introduce a time interval in the release of said switch for operation from said other position in accordance with its bias and connections between said resilient means and said switch effective to reduce the value of the biasing force when said switch member is operated from said one position to said other position and to increase the value of the biasing force when said switch is operated from said other position to said one position.

2. An electromagnetic time delay device comprising a switch member movable between open and closed positions, an electromagnet for holding said switch member in the open position, means for controlling the energization of said electromagnet to introduce a time delay in the release of said switch member from the open position, and resilient means for biasing said switch member to the closed position and connected with said switch member to exert a smaller biasing force when said switch is held in the open position by said electromagnet than when said switch is in the closed position.

3. An electromagnetic time element device comprising a movable switch member, an electromagnet for operating said switch member to and holding the same in one position, means for controlling the energization of said electromagnet to introduce a time delay in the release of said switch member from said one position, and spring means for biasing said switch member for movement from said one position and connected to exert an increasing biasing force as said switch member moves from said one position.

4. An electromagnetic time element device comprising a switch member having a pivotal mounting for movement between two positions, a coiled biasing spring connected to said switch member with the axis of the spring extending nearer the pivotal mounting thereof in one of said positions than the other to exert an increasing biasing force as the switch member moves from said one position to the other, an electromagnet for operating said switch from said other position to said one position and magnetically holding the same therein, and means for controlling the energization of said electromagnet to introduce a time interval in the release of said switch member for movement under the control of said biasing spring.

5. An electromagnetic time element device comprising a movable switch member having a knife-edge pivotal bearing for movement between two positions, a coiled compression biasing spring for said switch member having knife-edge pivotal end bearings disposed in closer alinement with the knife-edge bearing of said switch member when the switch member is in one of said positions than in the other, an electromagnet for operating said switch member from said other position to said one position and electromagnetically maintaining the same therein, and means for controlling the energization of said electromagnet to introduce a time delay in the release of said switch member for operation under the control of said biasing spring.

In witness whereof, I have hereunto set my hand this 16th day of April, 1928.

EDMOND CHARLES LEFRANÇOIS.